United States Patent
Cook et al.

(10) Patent No.: US 8,944,445 B2
(45) Date of Patent: Feb. 3, 2015

(54) SYSTEM FOR MANIPULATING CONCRETE SPREADING HOSES

(71) Applicants: Andrew D. Cook, Jackson, MI (US); Michael J. Scott, Horton, MI (US); Joel D. St. John, Onsted, MI (US)

(72) Inventors: Andrew D. Cook, Jackson, MI (US); Michael J. Scott, Horton, MI (US); Joel D. St. John, Onsted, MI (US)

( * ) Notice: Subject to any disclaimer, the term of this patent is extended or adjusted under 35 U.S.C. 154(b) by 60 days.

(21) Appl. No.: 13/672,114

(22) Filed: Nov. 8, 2012

(65) Prior Publication Data

US 2014/0125023 A1 May 8, 2014
US 2014/0367937 A9 Dec. 18, 2014

Related U.S. Application Data

(60) Provisional application No. 61/556,898, filed on Nov. 8, 2011.

(51) Int. Cl.
*B62B 5/00* (2006.01)

(52) U.S. Cl.
CPC .................................. *B62B 5/0083* (2013.01)
USPC ........................................... 280/79.6; 248/80

(58) Field of Classification Search
CPC ........ B62B 1/264; B62B 3/102; B62B 3/104; B62B 5/0083; B62B 1/262; E04G 21/04; A62C 31/28; A01G 25/09
USPC .......... 280/47.34, 79.6, 79.11; 248/75, 80, 89
See application file for complete search history.

(56) References Cited

U.S. PATENT DOCUMENTS

| | | | | |
|---|---|---|---|---|
| 1,515,824 A | * | 11/1924 | Best | 242/557 |
| 2,741,510 A | * | 4/1956 | McCulloch | 47/1.7 |
| 2,851,235 A | * | 9/1958 | Henig | 410/44 |
| 2,950,015 A | * | 8/1960 | Pataky | 211/182 |
| 3,191,786 A | * | 6/1965 | Langrell | 414/444 |
| 3,698,735 A | * | 10/1972 | Bloomfield et al. | 280/47.35 |
| 3,756,426 A | * | 9/1973 | Young | 414/745.5 |
| 3,822,800 A | * | 7/1974 | Leszczynski | 414/444 |
| 3,860,175 A | * | 1/1975 | Westerlund et al. | 239/165 |
| 5,018,930 A | | 5/1991 | Hardin et al. | |
| 5,219,175 A | | 6/1993 | Woelfel | |
| 5,476,352 A | * | 12/1995 | Culbertson et al. | 414/23 |
| 5,788,251 A | * | 8/1998 | Johnson | 280/43.17 |
| 5,806,868 A | * | 9/1998 | Collins | 280/79.6 |
| 6,099,001 A | * | 8/2000 | Barresi | 280/79.6 |
| 6,206,385 B1 | * | 3/2001 | Kern et al. | 280/47.35 |
| 6,209,893 B1 | | 4/2001 | Ferris | |
| 7,063,496 B2 | * | 6/2006 | Jackson et al. | 414/532 |
| 7,195,257 B2 | * | 3/2007 | Stoneback et al. | 280/79.6 |
| 7,780,123 B1 | * | 8/2010 | Bailyn et al. | 248/84 |

\* cited by examiner

*Primary Examiner* — John Walters
*Assistant Examiner* — Brian Swenson
(74) *Attorney, Agent, or Firm* — Young Basile Hanlon & MacFarlane P.C.

(57) ABSTRACT

A mobile support system for supporting a concrete pouring hose supports ten to sixteen feet of hose while providing sufficient ground clearance to avoid common obstacles. The mobile support system features large castors and conveniently placed hand holds to permit the mobile support system to be moved safely and easily. The system provides for socketed leg attachment, thereby allowing for ease of disassembly and storage.

15 Claims, 4 Drawing Sheets

SYSTEM FOR MANIPULATING CONCRETE SPREADING HOSES

RELATED U.S. APPLICATION

This application claims the benefit of U.S. Provisional Application No. 61/556898 filed Nov. 8, 2011.

FIELD OF THE INVENTION

This invention relates to a mobile support device for supporting and moving concrete spreading hoses.

BACKGROUND

In the construction industry it is common for concrete to be used and conveyed to the job site via hoses. Concrete is typically either delivered by transit mix trucks or mixed on site. The problem is that these sources of mixed concrete are typically at some distance from the actual site where the concrete is needed. Typically, uncured concrete is pumped from a mixing truck to the area to be filled utilizing a pumping device which feeds a flexible hose. Mixed but uncured concrete has a slurry-like consistency, and is difficult to deliver by hose. A common solution to this problem is to use a large diameter hose, which may range from about three inches in diameter to about ten inches in diameter, with about five inches being typical. When filled with uncured concrete, this hose may weigh up to 30 pounds per foot. With tens of feet of hose being a typical installation, devices which support and move the hose are advantageous. In order to facilitate distribution of the uncured concrete, it is desirable to position the hose off the ground, and provide a structure to support the hose so that it is easily movable, even though carrying substantial weight.

Devices have been developed which attempt to perform these functions. U.S. Pat. No. 5,219,175 (Woelfel) and U.S. Pat. No. 6,209,893 (Ferris) disclose support devices for concrete hoses. Both of these devices use a single, short support to hold the hose resulting in the hose only being supported for less than one foot of its length. In addition, these supports both arrange the supports so that the weight of the supported hose is centered below the tops of the wheels, thereby making the devices more stable. The present designs, however, are still inherently unstable, allowing the supports to rock in relation to the hose, and allowing the hose to contact the ground. Further, surges and collapses in the flexible hose can result in tipping of the hose supports in relation to the hose, which can sometimes impede the pumping process. Another shortcoming in the prior art is the relatively short portion of the support which underlies the hose. This abbreviated dimension allows the hose to flex excessively unless many separate support assemblies are employed. These design features mean that multiple supports may be needed to support a significant length of concrete spreading hose. Likewise, the low center of gravity means that these supports have very low ground clearance and therefore must be lifted over obstacles. In addition, the placement of the lifting handles is such that operators must place their feet on either side of the wheels in order to lift the device, placing the operator's feet in danger of being rolled over by the wheels.

It is desirable then, that a mobile support device for supporting and moving concrete spreading hoses be available which overcomes these limitations. In particular, it is desirable to provide a concrete pumping flexible hose support which resists tipping as it is moved from one distribution location to the next, which discourages buckling or collapsing, which provides readily accessible handles for repositioning, and which elevates the hose above the work site, while at the same time providing improved support along the longitudinal axis of the hose.

SUMMARY OF THE INVENTION

Aspects of the present invention provide for a mobile support device for supporting and moving concrete spreading hoses. Disclosed herein is a mobile support system for supporting a concrete spreading hose, comprising two or more supports spaced apart so as to support a length of concrete spreading hose; at least four large-diameter casters; a frame arranged to rotatably fixture the casters and to position the supports above the casters; and a hand hold arranged around the perimeter of the mobile support system above the wheels and below the supports. It is an object of the invention to provide an improved wheeled support for flexible concrete carrying hoses which provides stability for the flexible hose in all three dimensions, while still allowing a high degree of mobility. It is a further object of the invention to provide such a support which prevents or inhibits collapses of the hose during the concrete pumping and distribution process. It is a further object of the invention to provide such a support which offers increased clearance between the flexible hose and the work surface over which it is suspended, and to provide convenient hand holds for positioning the support and improved safety for the operator in positioning the support.

DESCRIPTION OF THE PREFERRED EMBODIMENT

Figure 1:
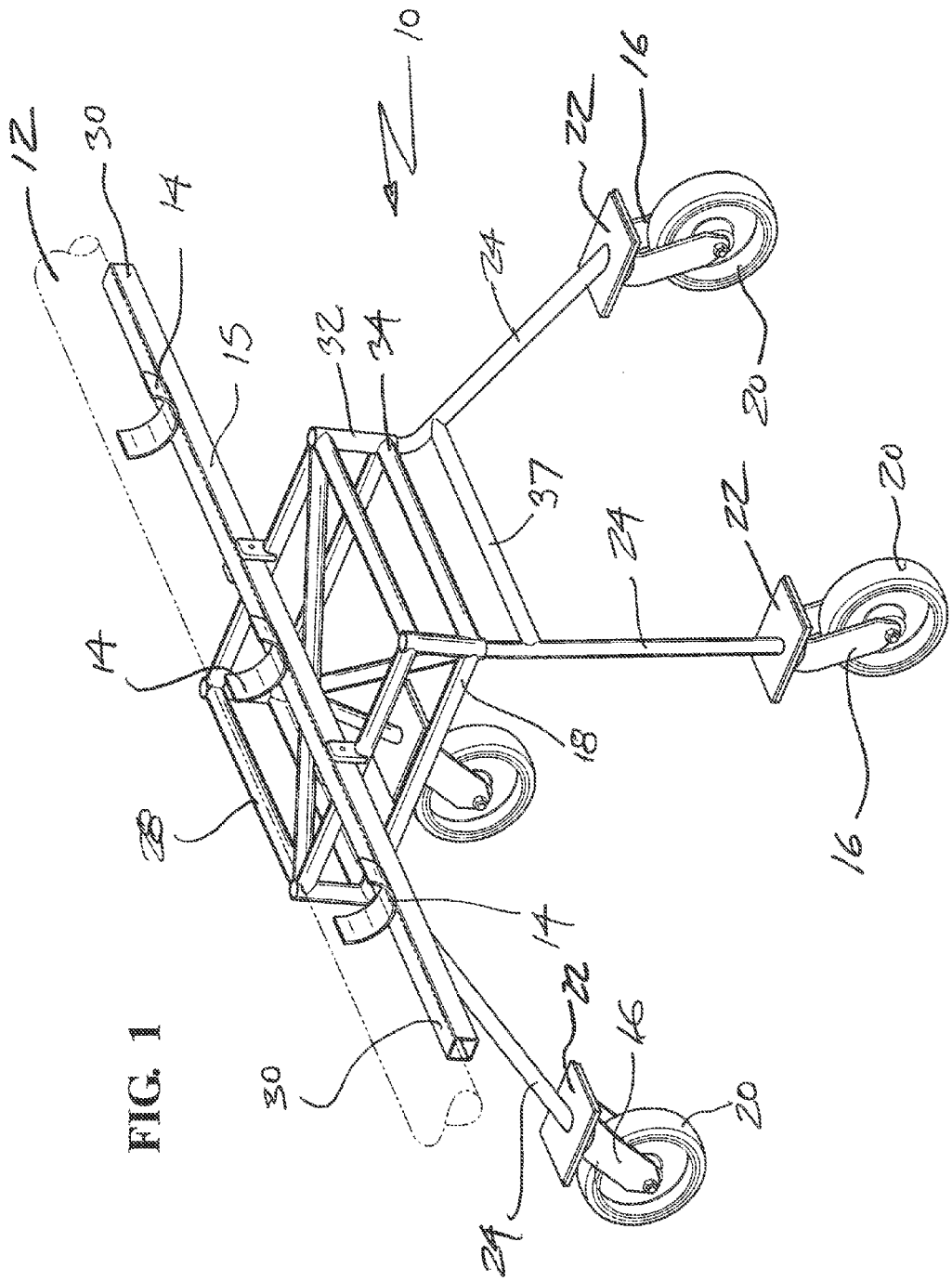
FIG. 1 is an isometric view of an embodiment of this invention.
Figure 2:
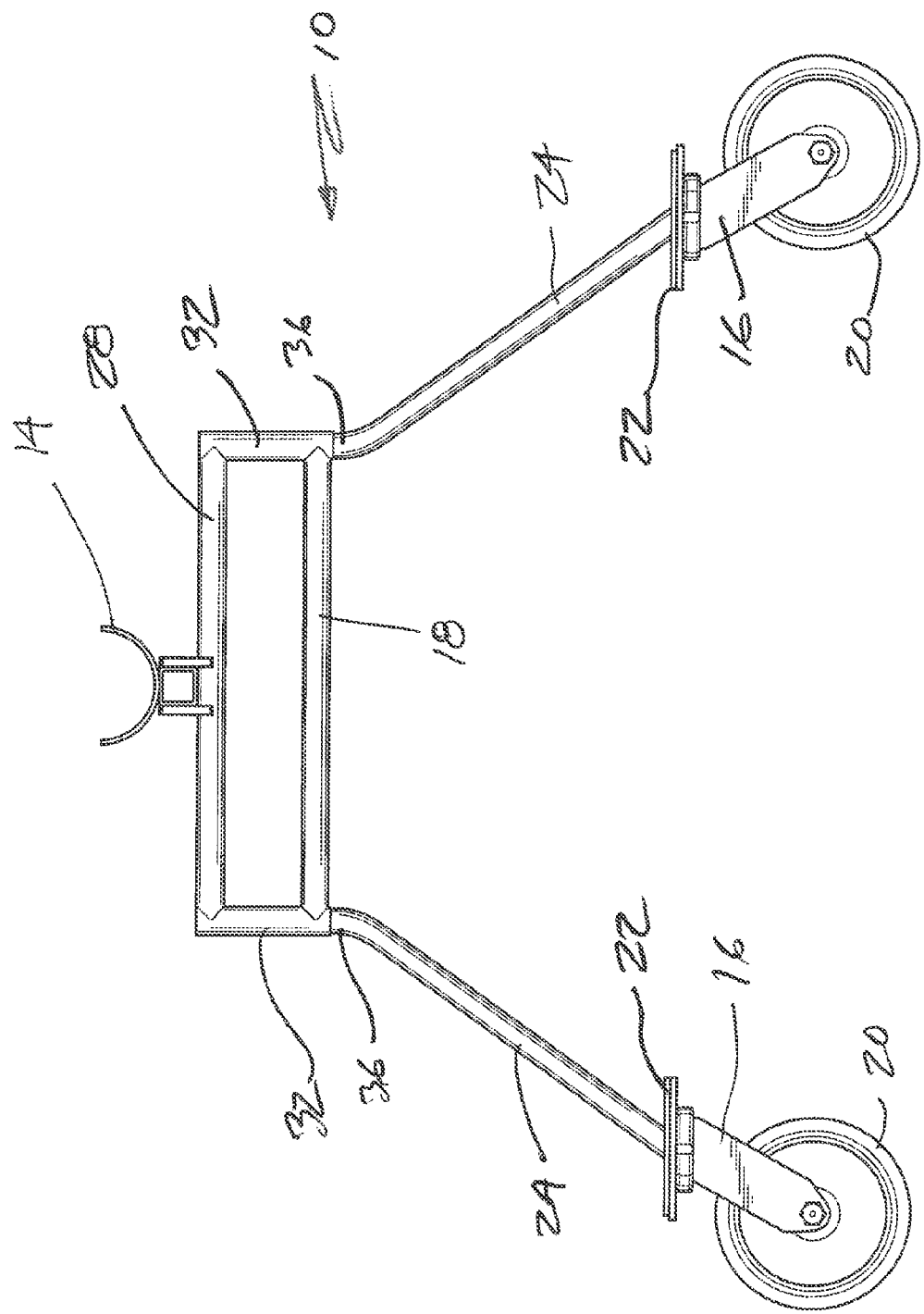
FIG. 2 is a side view of an embodiment of this invention.
Figure 3:
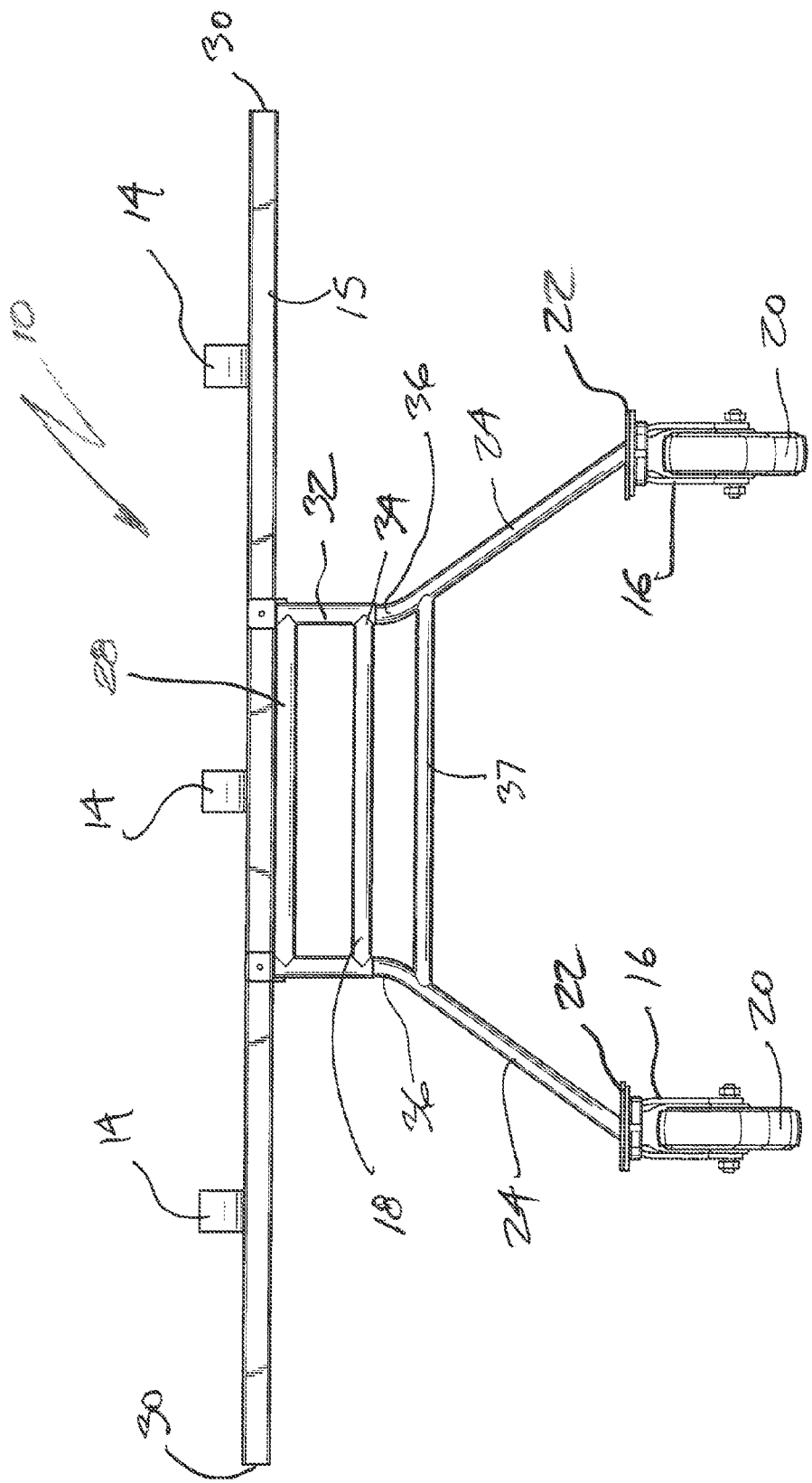
FIG. 3 is a front view of an embodiment of this invention.

Aspects of the present invention provide for a mobile support device for supporting and moving concrete spreading hoses. FIGS. 1-4 show a mobile support assembly 10 for supporting a concrete spreading hose 12. The assembly is preferably constructed as a metal framework having sufficient strength to support the anticipated loads, while the hose 12 as above described is generally flexible. It will be appreciated that the preset invention will also function effectively when used with rigid or semi-rigid pipes or similar conduits. The mobile support assembly 10 comprises two or more holders 14 spaced apart on a support beam 15 so as to support a length of concrete spreading hose 12. The holders 14 are preferably in the configuration of a semi-cylindrical section, open at the upper end and affixed by fasteners or weldment to a support beam 15. Elongated support beam 15 is of rigid solid or tubular construction and may be of circular or polygonal cross-section. The support beam 15 is affixed to hand hold 28, which in turn is affixed to frame 18 at tubular sockets 32. The frame 18, hand hold 28 and sockets 32 form a box-like structure which imparts rigidity to the assembly 10. The ends 30 of support beam 15 extend outward from opposing sides of the rigid frame 18 to facilitate manipulation of the assembly 10 as will be further described herein.

The assembly 10 further comprises at least four large-diameter casters 16, where large diameter is defined as 16 inches in diameter or greater. Large casters 16 are preferable in the typical work environment, where small, commonly occurring debris, such as gravel, nails, and the like may interfere with the operation of smaller wheels. The casters 16 may be provided with either solid or pneumatic tires 20, which pivot on caster mounts 22 in the conventional fashion. The invention incorporates a frame 18 arranged to position legs 24 and casters 16 and to position the support beam 15 above the casters 16. The frame 18 is preferably constructed of solid bar stock or hollow metal tubing, and is in the form of a rectangular structure to which is attached a plurality of legs 24 constructed of like material. The legs 24 extend downwardly and outwardly of said frame 18, and at their distal ends are provided with the caster mounts 26 above described. A hand hold 28 is arranged above the frame 18 of the mobile support assembly 10, above the wheels 16 and below the supports 14, so that operators can lift or move the mobile support assembly 10 without placing their feet in danger from the casters 16. Although the mobile support assembly 10, by virtue of having the hose supports 14 well above the casters 16, has a high center of gravity, the four casters 16 are located at the corners of the mobile support assembly 10 so as to provide adequate stability during use. In addition, the location of the elongated support beams 15 extending beyond the perimeter of the mobile support assembly 10 helps to keep the operator away from the hose 12 during use and permits operators to have additional safe and effective hand holds. To provide rigidity to the frame 18 and legs 24, diagonal brace 38 is provided which extend from one corner 34 of the support frame 18 to a diagonally opposed corner 34 of said frame, and an additional brace 38 extends from one corner 34 of hand hold 28 to a diagonally opposed corner 34 of said hand hold. Preferably said braces 38 are constructed of solid bar stock, or hollow tubing.

Legs 24 are preferably constructed in pairs and each pair is interconnected by lateral brace 37. Frame 18 is provided with tubular sockets 32 attached to the frame 18 and held hold at corners 34. The upper end 36 of leg 24 are sized to removably fit within sockets 32, where legs 24 may be secured with fasteners (not shown). Likewise, legs 24 may fit into sockets 32 utilizing only a slide fit, whereby the weight of frame 18 and hand hold 28 serves to hold the sockets 32 in engagement with the upper ends 36 of legs 24. In this fashion, the assembly may be disassembled for compact storage.

Figure 4:
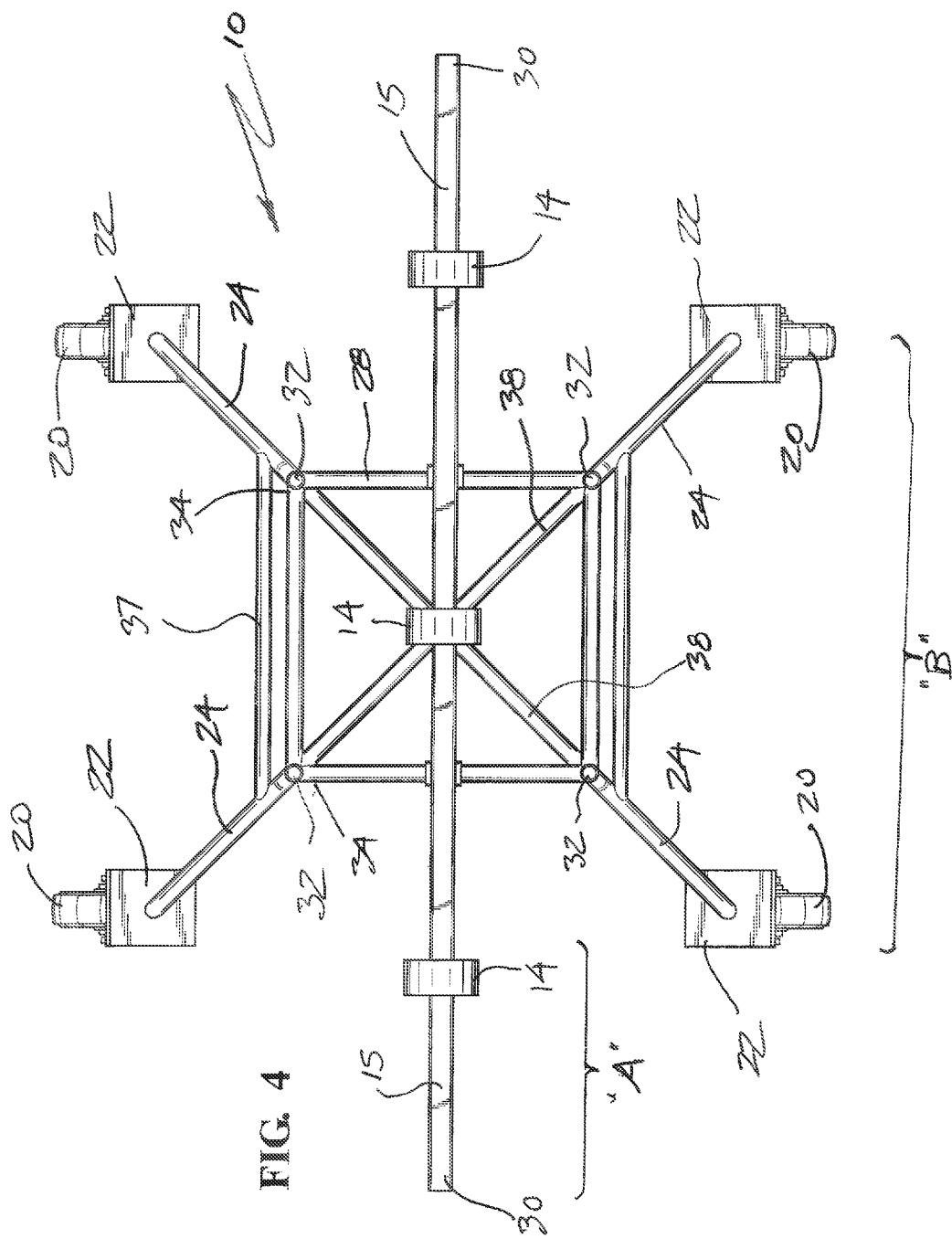
FIG. 4 is a top view of an embodiment of this invention.

With reference to FIG. 4, it will be appreciated that support beam 15 extends laterally across hand hold 28, and extends distance "A" beyond the track "B" of the support assembly. This facilitates manipulation of the entire assembly by the operator, reducing risk that the casters 16 will interfere with the operator's person during re-positioning of the hose 12.

Embodiments of this invention use four supports 14 to support about ten feet of hose 12 and clear obstructions less than two feet high and two feet wide, permitting the hose 12 to be supported and moved forward, backward or side to side. Each assembly has a supporting beam 15 that typically supports 10 to 16 feet of hose. The normal gap between the support assemblies is between four and six feet. Therefore a set of four mobile support assemblies 10 can support over 80 feet of hose and keep it clear of the work surface. A typical pumping hose weighs over 30 pounds per foot when filled, giving the operators over 2400 pounds of concrete to transport.

Concrete pouring generally proceeds from areas distant from the concrete source to the source. As the pour proceeds, a way to handle the decrease in distance from the source is to remove sections of hose, a time-consuming and messy task. Aspects of this invention permit the mobile support assemblies carrying the hose sections to be moved in opposite directions thereby folding the hose back on itself, thereby shortening the effective hose length and reducing the need to remove sections of hose. In addition, the placement of the last section of hose on the mobile support system permits the operator to distribute the concrete directly from the hose on the mobile support system thereby reducing the burden on the operator to lift and move the end of the hose while distributing concrete.

We claim:

1. A mobile support system for supporting a concrete spreading hose, comprising:
   two or more supports spaced apart along a support hose beam so as to support a length of concrete spreading hose;
   at least four large-diameter caster wheels;
   a frame arranged to rotatably position said caster wheels and to position said support hose beam above said caster wheels; and,
   a hand hold arranged around an outer periphery of said mobile support system above said caster wheels and below said support hose beam.

2. The mobile support system of claim 1 wherein said length of concrete spreading hose supported by said mobile support system is between about 4 feet and 20 feet.

3. The mobile support system of claim 1 wherein said length of concrete spreading hose supported by said mobile support system is between about 10 feet and 16 feet.

4. The mobile support system of claim 1, wherein said hose support beam extends beyond said outer periphery of said frame.

5. A mobile support assembly for supporting a concrete spreading hose comprising:
   a quadrilateral framework of rigid material having four corners, an outer periphery, a lengthwise dimension, and a socket disposed at each of said corners;
   a plurality of legs, each of said legs having a proximal end and a distal end;
   a plurality of caster wheels, one of each said caster wheels affixed to said distal end of one of each of said plurality of legs;
   one of each of said plurality of legs removably attached to one of each said corners; and
   a hose support beam affixed to said frame, said hose support beam having opposing ends and a lengthwise dimension greater than said widthwise dimension of said quadrilateral frame.

6. The mobile support system of claim 5, which further comprises a hand hold attached to said frame.

7. A mobile support system for supporting a concrete spreading hose, comprising:
   a quadrilateral frame having a first side, a second side, a third side, and a fourth side, wherein said first side and said second side are spaced apart by a first dimension, said third side and said fourth side are spaced apart by a second dimension, and said first side, said second side, said third side, and said fourth side define an outer periphery for said quadrilateral frame;
   a first leg assembly and a second leg assembly each having a pair of spaced-apart leg members each having a first end and a second end, said first end of each leg member being removably connected to said quadrilateral frame, said second end of each leg member having a caster wheel connected thereto, and a brace member that extends between and interconnects said leg members; and
   a hose support beam that extends from said first side to said second side, said hose support beam having a length that is greater than said first dimension, such that a first end and a second end of said hose support beam are disposed outside of said outer periphery of said quadrilateral frame.

8. The mobile support system of claim 7, wherein each leg member of said first leg assembly and said second leg assembly extends downwardly and outwardly from said quadrilateral frame.

9. The mobile support system of claim 8, wherein said caster wheels are disposed outward from said outer periphery of said quadrilateral frame.

10. The mobile support system of claim 7, wherein said quadrilateral frame is located entirely below said hose support beam.

11. The mobile support system of claim 7, further comprising:
one or more arcuate members disposed on said hose support beam for supporting a length of concrete spreading hose.

12. The mobile support system of claim 11, wherein said one or more arcuate members each have a width that is greater than a width of said hose support beam.

13. The mobile support system of claim 7, further comprising:
a first arcuate member and a second arcuate member each disposed on said hose support beam for supporting a length of concrete spreading hose, wherein said first arcuate member is located outward from said outer periphery of said quadrilateral frame between said first end of said hose support beam and said first side of said quadrilateral frame, and said second arcuate member is located outward from said outer periphery of said quadrilateral frame between said second end of said hose support beam and said second side of said quadrilateral frame.

14. The mobile support system of claim 7, wherein said quadrilateral frame includes a plurality of sockets each located at a respective corner of said quadrilateral frame, and said leg members of said first leg assembly and said second leg assembly are removably connected to said quadrilateral frame by disposition of said first end of each leg member in a respective socket from said plurality of sockets.

15. The mobile support system of claim 7, wherein said quadrilateral frame includes a plurality of interconnected tubular members.

* * * * *